United States Patent Office 3,126,661
Patented Mar. 31, 1964

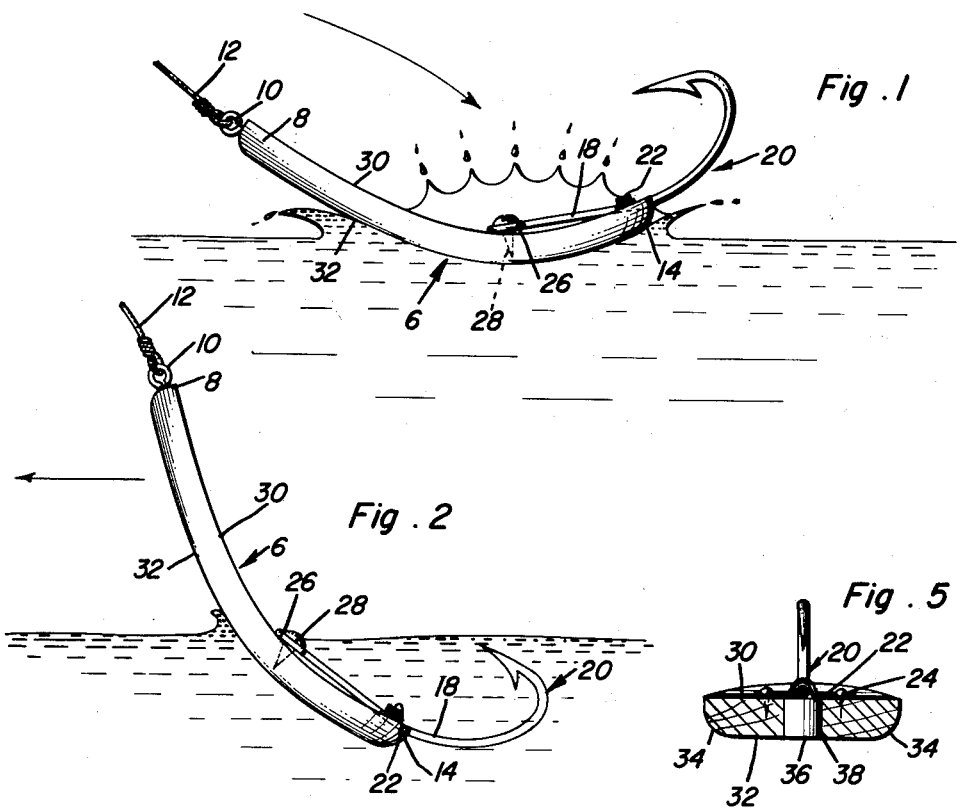

3,126,661
LURE WITH BALANCING WEIGHTS
Howard N. Phillips, 410 Park St., New Madrid, Mo.
Filed Nov. 29, 1962, Ser. No. 240,860
3 Claims. (Cl. 43—42.39)

The present invention relates to an artificial lure which features deception and imitation and functions to catch fish, particularly black bass, and is such in construction that it can be satisfactorily used with a casting reel and rod or, alternatively, a spinning reel and rod.

Briefly, the lure comprises a body which is substantially ovate in plan, is bowed lengthwise, provided at the broad trailing end with a securely anchored fishhook and provided at the narrower leading end with an eye for attachment of the fishing line thereto. While the body resembles a spoon the top and bottom surfaces, unlike the concavo-convex faces of a spoon bowl, are substantially planar.

The body is made of a material which is buoyant. The median and rearward portions, respectively, have weights embodied therein thus providing a weighted lure which is such that it may be retrieved rapidly, sinks very slowly and can be stopped on moss, lily pads, lake weeds and grass without fouling.

In carrying out the preferred embodiment of the invention a simple, practical and easy-to-cast lure has been provided. Experimental use of a lure constructed in accordance with the instant invention has repeatedly shown that it will land atop the water being fished and will almost invariably remain in an upright position. Floating atop the water, as it does, complicated and unreliable wire or equivalent weed guards are not required. Accordingly, the lure is weedless.

The lure features two lead pellets which constitute weights which are proportional with each other, with the lure body in which they are mounted and are oriented to assume positions which effectually cause the lure to drop down on the moss or weeds to assure movement of the same.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in side or edge elevation of a self-balancing artificial lure constructed in accordance with the invention and illustrating the same in the position which it assumes (upright as shown) atop the surface of the water as a result of the cast indicated by the arrow;

FIGURE 2 is a similar elevational view and which, with the aid of directional arrows, shows the behavior of the lure on the retrieve wherein it has an upward and downward position with the weighted end submerged;

FIGURE 3 is a top plan view of the lure depicted in FIGURE 1; and

FIGURES 4 and 5 are longitudinal and transverse sections taken on the section lines 4—4 and 5—5, respectively of FIGURE 3.

With reference now to the figures of the drawing, the body of the lure 6, as shown in FIG. 3 is substantially ovate in plan. The narrower leading end 8 is provided with a terminal eye 10 to which the fishing line 12 is tied in the customary way. The broader arcuate rearward or trailing end is denoted at 14. The median portion of this rounded end is provided with a lengthwise groove or kerf 16 in which a limited portion of the shank 18 of the fishhook 20 is seated. A cross-cleat 22 is provided and is fastened at its terminal ends 24 on opposite sides of the shank. It has a median bent portion which is saddled over the shank to ensure secure mounting of the hook on the lure. The forward end of the shank is provided with an eye 26 which is secured by a screw-threaded headed fastener 28. The body is preferably of waterproof wood and it is longitudinally bowed to assume the gradual curvature depicted in FIGURE 1. The major portion of the top side of the lure (FIG. 5) is substantially planar as denoted at 30 and is substantially parallel with the approximately planar bottom or ventral side 32. The marginal edges 34 in FIG. 5 merge into the planar surface 32 and are preferably convexly rounded to achieve a desirable junctional association between the surfaces and to give effect to the fact that the lure (as experience has repeatedly shown) lands in the water when cast and stays upright as shown in FIG. 1 and has the action and position shown in FIG. 2 on the retrieve. In other words, it will land in the water in an upright position at all times and requires no wires or any objects to assure that it will be weedless. On the retrieve it has a forward and backward movement producing the desired gurgling sound. To accomplish this two lead pellets are provided, one pellet 36 being securely fitted in the hole 38 and the other pellet 40 being fitted securely in the hole 42. The holes extend through the top and bottom surfaces and the weights or pellets are such that the top and bottom ends thereof are exposed by way of the top and bottom surfaces of the lure. Careful planning and trial and error with a view toward acquiring the desired balance in the finished lure has decreed that weights 36 and 40 shall be in the precise position shown, that is, midway between the lengthwise edges as illustrated in plan in FIG. 3, and one to the front and the other to the back of the point of attachment of the shank of the fishhook and both weights embedded in the median and rearward half-portion of the body as clearly shown in FIG. 3.

These structural features and the intended advantages and novel results are inherent in a lure having the particular form and construction illustrated in the figures of the drawing, described in the specification and comprehended in the claims.

It is a matter of common knowledge that anglers follow their individual inclinations in choice and selection of lures depending on whether they are using a casting rod, spinning rod or a fly rod. The lure shown is such in design and construction that it lends itself to production in the several sizes required for the several forms of rods mentioned.

This lure is never pulled across the top of the moss because as experience has shown the choice and precision location of the weights will in seconds cause the lure to shift its position from that depicted in FIG. 1 to that depicted in FIG. 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing lure comprising a one-piece elongated buoyant body ovate in plan, longitudinally bowed, having parallel planar upper and lower sides, one end of said body being rounded constituting the trailing end, the opposite progressively narrowing end constituting the leading end, said leading end having an upwardly directed terminal portion terminating in a plane above the plane of the upwardly directed trailing end and having means thereon for attaching a fishline thereto, the rearward end portion of said body having a groove in the upper side, a fishhook comprising a shank having a barbed hook at its rearward end and an eye at its forward end, a portion of the shank proximal to said hook being seated in said keeper seat with the barbed hook vertical to and in a plane above said upper side, the eye of said shank being secured by a fastener to the median rearward portion of said upper side, a shank-bridling cleat disposed at right angles to said shank and having a median bent portion saddled over the shank in alignment with said groove and having end portions secured to said upper side inwardly of the encompassing marginal edges of the body, and weight means embodied in said body and cooperating therewith and also with the hook and cleat in a manner to balance the overall lure and to cooperate therewith in causing the lure to behave in a predetermined manner in water laden with moss, lily pads, and lake weeds without fouling.

2. The structure defined in claim 1 and wherein said weight means comprises a first weighted pellet embedded in a median portion of the body in alignment with but forwardly of said eye, and a second weighted pellet complemental to said first pellet, said second pellet being embedded in said body in alignment with but rearwardly of said eye and being beneath and aligned with said shank and occupying a position between said cleat and said eye.

3. A fishing lure comprising an elongate buoyant body ovate in plan, said body having a broad marginally rounded end constituting the trailing end, also having a gradually narrowing opposite end constituting the leading end, said body being longitudinally bowed and providing an upper concave side and a lower convex side, said leading end being provided with means for attaching a fishline thereto, said upper and lower sides having planar surfaces which are substantially parallel to each other, a first weighted pellet embedded in a median portion of said body and spaced from but located substantially midway between adjacent lengthwise marginal edges of the body, a second weighted pellet embedded in the rearward median portion and spaced longitudinally from said first pellet and in alignment therewith, a fishhook embodying a shank having a barbed hook at a rearward end and an eye at a forward end, means securing a median portion of the shank to said rearward end, the forward end of said shank overlying and being aligned with said second pellet, the eye of said hook being located in the space between said pellets and being secured to said body between said pellets.

References Cited in the file of this patent
UNITED STATES PATENTS

| | | |
|---|---|---|
| D. 122,890 | Clark | Oct. 8, 1940 |
| D. 126,558 | Mangle | Apr. 15, 1941 |
| 923,095 | Wilcox | May 25, 1909 |
| 2,633,659 | Baum | Apr. 7, 1933 |